Aug. 4, 1942.  L. C. ROTTER ET AL  2,292,294
RELIEF VALVE
Filed Oct. 7, 1940
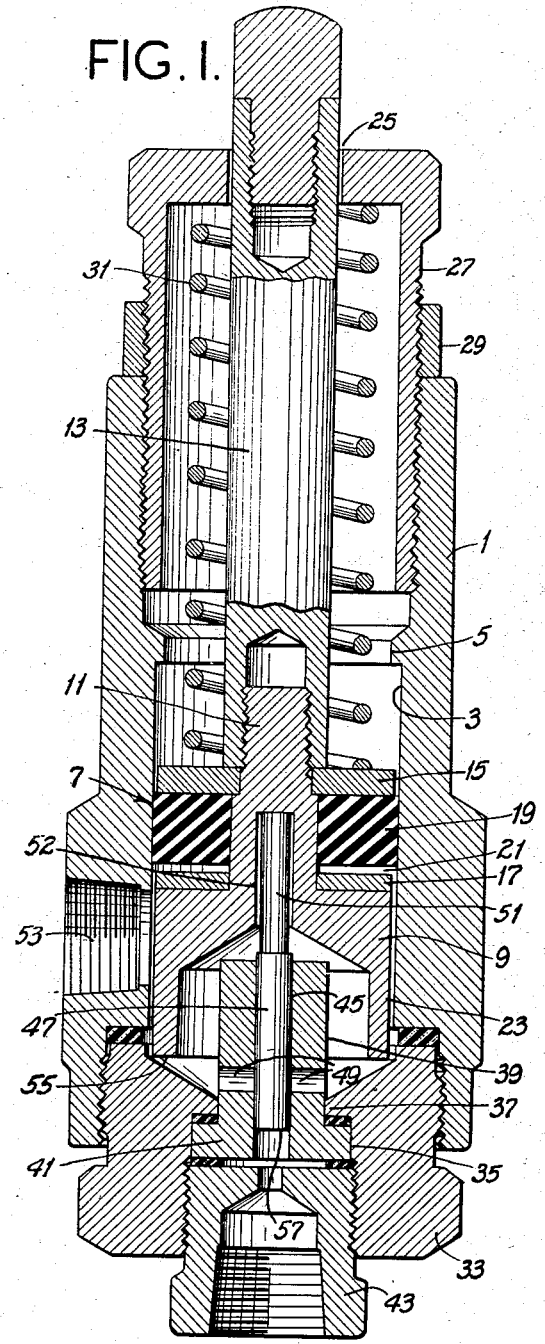
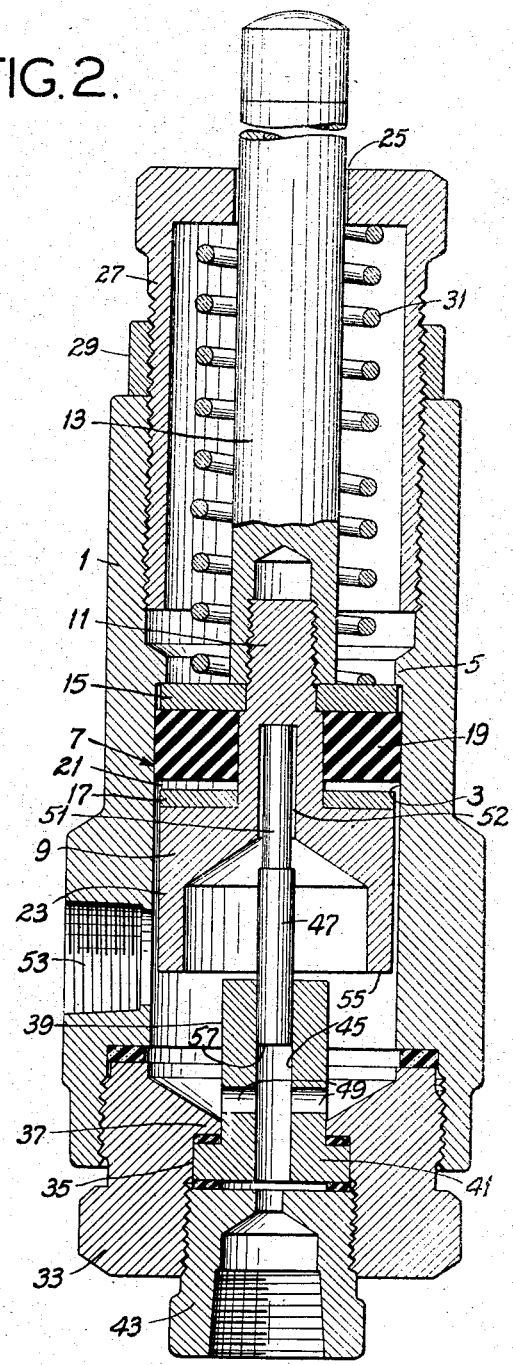
Lutwin C. Rotter,
Victor G. Klein,
Inventors.
Haynes and Koenig,
Attorneys.

Patented Aug. 4, 1942

2,292,294

UNITED STATES PATENT OFFICE 2,292,294

RELIEF VALVE

Lutwin C. Rotter, Maplewood, and Victor G. Klein, St. Louis, Mo., assignors to Lincoln Engineering Company, St. Louis, Mo., a corporation of Missouri Application October 7, 1940, Serial No. 360,078

2 Claims. (Cl. 137—53)

This invention relates to relief valves, and with regard to certain more specific features, to relief valves for bleeding lubricating apparatus and the like.

The construction herein described is an improvement upon that disclosed in the Lutwin C. Rotter United States Patent 2,162,898, dated June 20, 1939.

Among the several objects of the invention may be noted the provision of a bleeder relief valve of the type described in said patent, in which is avoided variation in valve-seating area and operating pressure ratios; the provision of a valve of the class described which maintains a high degree of accuracy throughout its life; and the provision of a valve of this class which effects a definite cut-off effect upon closing, regardless of ordinary amounts of foreign material that may cross the valve seat. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, Fig. 1 is a vertical section illustrating the invention in closed position; and, Fig. 2 is a view similar to Fig. 1 but showing the device open.

Similar reference characters indicate corresponding parts throughout the two views of the drawing.

In the valve of said patent, the valve-closing element is conical and rests upon a circular seat. As wear takes place, the seat enlarges. Also the valve and its seat are ordinarily reground to a sealing fit after wear has taken place, and the result is that the area under the valve when closed and exposed to pressure is variable throughout the life of the device. Since the pressure which opens the valve is substantially high (of the order of several thousand pounds per square inch), any small variation in valve-seating area means a relatively large variation in the valve-opening pressure. Also, since the closing of the valve is effected by a spring on a piston of constant diameter, the result will be a high variation in the ratio of the variable opening pressure to the fairly constant hold-open pressure. A cone valve such as used in the patent is also subject to having foreign material, such as grit, rest upon the valve seat upon slow closure, whereupon leakage take place. The present invention avoids these disadvantages.

Referring now more particularly to the drawing, numeral 1 is a body portion forming a cylinder 3 at the upper end of which cylinder is a back stop or shoulder 5.

Reciprocating in the cylinder 3 is a piston 7 consisting of a hollow head 9 which has a definite clearance with respect to the wall of the cylinder 3 to provide leakage around the head. This head has a stem 11 which is threaded into a guide rod 13 and at the threaded portion holds in place a rear plate 15. A front plate 17 rests on the head 9; and between the plates 15 and 17 is a resilient packing 19, formed for example of artificial rubber which will withstand lubricant without deterioration. The packing is fitted with some initial tension around the stem 11 and against the wall of the cylinder 3, but with substantial clearance underneath as shown at 21. The clearance 21 communicates with the clearance between the head 9 and the wall 3. Thus lubricant under the head 9 may exert limited pressure beneath the packing 19 to some extent, the limitation being due to the throttling action through the clearance between the head 9 and wall 3. Hence there is effected some radial sealing between the packing 19 and cylinder 9, in proportion to applied axial pressure.

The stem 13 is guided at its upper end in an opening 25 of an adjustable cap 27. The cap is adjustably threaded onto the body 1 and held in any desired adjusted position by a lock nut 29. A spring 31 reacting from the upper end of the cup 27 and against the piston 7, serves normally to bias the piston downward.

Downward motion of the piston 7 is limited by a lower enclosing head 33 which is threaded into the body 1 and which is provided with an inlet 35. Above the inlet is a shoulder 37 within which and in the inlet 35 is a hardened bushing 39 also having a shoulder 41 which is sealed against the shoulder 37 and held in place by a hollow inlet nipple 43. The nipple 43 is threaded to receive a pressure line.

The bushing 39 is provided with an axial cylindrical passage 45 which is accurately reamed during manufacture to receive accurately the lower end of a reciprocating plunger 47. This plunger is preferably accurate in the bore 45 to within a fraction of a thousandth of an inch. The bushing 39 is provided with lateral openings 49 which are traversed by the lower end 57 of the plunger 47.

The upper end 51 of the plunger abuts the upper end of a hollow socket portion 52 within the head 9. The upper end 51 of the valve 47 is made substantially smaller than the socket 52 in which it is positioned, so that any small axial misalignment may be taken care of between the valve 47 and the head 9.

The body 1 is provided with a relief outlet 53 which is traversed to some extent by the lower edge 55 of the head 9, as indicated by the relative positions in Figs. 1 and 2.

Operation is as follows:

Starting with the parts down as shown in Fig. 1, let it be assumed that pressure builds up in the line connected with the inlet nipple 43. This is applied to the accurately machined area 57 at the lower end of the plunger 47, which raises the plunger. The plunger pushes up the piston 7 against the reaction of the spring 31. Then the valve end 57 crosses the ports 49, whereupon fluid under pressure escapes into the portion in cylinder 3 which is beneath the skirt 23 of head 9. Since the effective area of the piston 7 is larger than the exposed area 57 of the plunger 47, a much lower pressure serves to hold the parts up (as shown in Fig. 2) than is required to initiate opening from the position shown in Fig. 1. Since the ratios of the area between 57 and 7 are large, as can be seen from the drawing, a slight error or change in the area 57 results in a relatively large error in the opening pressure and pressure ratio between opening conditions and conditions after opening.

It is desirable to avoid the above-specified errors, and the present invention does so, because the area 57 remains substantially the same throughout the life of the device. It does not change its size, as does a conical valve seat. Furthermore, since the lower end of the plunger 47 crosses the port 49 and cuts off flow by means of a shearing action, rather than by a compressive action, as is the case with a cone valve, any foreign material is less likely to block the valve and hold it open. This is because the foreign material is either sheared or pushed aside more readily than is the case with a conical valve.

As the piston 7 rises, the lower edge 55 of skirt 23 thereon traverses part of the relief port 53 so as freely to relieve pressure at first. This relieves pressure in the lines connected with the nipple 43 and as the pressure goes down the piston 7 descends under action of the spring 31. However, the pressure may descend below that of the pressure required for opening the valve 47 before reclosure occurs, because of the excess area under the piston 7 as compared with the area 57. Finally when the port 53 is again crossed by 57, the valve 47 is still open, and from this point on descent of the piston 7 occurs more slowly under throttling action, which occurs because of slow leakage through the clearance between the skirt 23 and wall 3 and to said outlet 53. After some leakage, the valve 47 is closed.

Since the reclosing action of the valve 47 is intendedly slow, it is the more important that the end 57 in crossing the port 49 have a sure effect in shearing through any foreign material. Stated in another way, under the conditions under which these valves operate there is a substantial time during which there is a very small valve opening during which grit may be easily caught in a cone type of valve as it closes, because of the squeezing closing action. The present invention avoids this by preventing said grit from substantially interfering with valve closure through the shearing action.

Another advantage of the present invention is that all flattening action of any cone valve on its seat is avoided. Such flattening action tends to change the area which is responsive to pressure, and hence also the pressure even in cases where a valve does not require regrinding.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. A relatively high-pressure relief valve adapted to remain open under relatively low pressure, comprising a main cylinder having a pressure inlet and a main pressure outlet, a reciprocating piston loosely fitted in the cylinder, means normally biasing the piston toward the inlet, valve cylinder means associated with the inlet comprising a cylindric bushing portion, at least one outlet opening laterally from said valve cylinder means, a cylindric valve accurately fitted in said valve cylinder means and having an end exposed to inlet pressure and traversing said outlet in the valve cylinder means, and means on said valve loosely associated with the piston to accommodate the lateral movement of said piston due to its loose fit in the cylinder, the area of said piston being substantially greater than that of said cylindric valve, and a skirt on the bottom of the piston having a loose fit with respect to said main cylinder for traversing the outlet of the main cylinder.

2. A relief valve comprising a main hollow body portion providing a cylinder having an axial inlet and a lateral outlet, a piston loosely fitted in the cylinder and having a sealing portion permitting said looseness, a head on the piston having a substantial clearance with respect to the cylinder and traversing the outlet, a spring biasing the piston so that the head normally covers the outlet, a cylindric piston valve body in the inlet of the main body having an accurate cylindric bore therethrough, a piston valve accurately fitted in the bore, said bore having an outlet traversed by the lower end of the piston valve, said valve having an extension loosely associated with the piston, said head being adapted loosely to cover said lateral outlet in the main body prior to the closure of said valve over the outlet in the piston valve body.

LUTWIN C. ROTTER.
VICTOR G. KLEIN.